United States Patent [19]
Korte et al.

[11] 3,897,404
[45] July 29, 1975

[54] PROCESS FOR THE PRODUCTION OF COPOLYMERS CONTAINING ACRYLIC ACID AMIDES

[75] Inventors: Siegfried Korte, Leverkusen; Carlhans Süling, Odenthal-Hahnenberg; Günter Lorenz, Dormagen, all of Germany

[73] Assignee: Bayer Aktiengesellschaft, Leverkusen-Bayerwerk, Germany

[22] Filed: Apr. 11, 1973

[21] Appl. No.: 349,970

[30] Foreign Application Priority Data
Apr. 11, 1972 Germany............................ 2217334
Feb. 1, 1973 Germany............................ 2304891

[52] U.S. Cl. .............. 260/79.5 NV; 260/29.6 TA; 260/32.6 N; 260/79.7; 260/80.72; 260/80.73; 260/89.5 S; 260/96 R
[51] Int. Cl. ... C08f 15/40; C08f 27/06; C08f 27/08
[58] Field of Search ......... 260/89.5 S, 80.73, 80.72, 260/79.5 NV, 79.7

[56] References Cited
UNITED STATES PATENTS
2,476,527   7/1949   Barnes .................................. 260/8

FOREIGN PATENTS OR APPLICATIONS
655,951   1/1938   Germany
1,060,602   1/1961   Germany
1,088,231   9/1964   Germany

*Primary Examiner*—Stanford M. Levin
*Attorney, Agent, or Firm*—Plumley & Tyner

[57] ABSTRACT

The invention provides a process for the production of ternary and quaternary copolymers containing N,N-disubstituted acrylic acid amides which comprises reacting polyacrylic acid-$C_1$-$C_4$-alkyl ester with secondary alkyl or cycloalkyl monoamines in aprotic solvents at temperatures of from 100° to 250°C and under pressure of from 0 to 100 atms. The reaction products according to the invention are particularly suitable for use as thickeners for printing pastes and as gloss stabilisers for modacrylic filaments and films.

4 Claims, 3 Drawing Figures

PROCESS FOR THE PRODUCTION OF COPOLYMERS CONTAINING ACRYLIC ACID AMIDES

This invention relates to a process for the production of ternary and quaternary copolymers which contain monomer units of N,N-disubstituted acrylic acid amides together with acrylic acid and acrylic acid ester groups in the polymer chain.

It is known that copolymers made up of the aforementioned monomer units can be obtained by copolymerising acrylic acid esters, acrylic acid and the corresponding acrylic acid amides. The structure and composition of the products obtained by this process are determined solely by the reactivities of the starting components and by the level of conversion obtained during the polymerisation reaction. Since N,N-disubstituted acrylic acid amides are only commercially available to a limited extent, production of the aforementioned materials by copolymerisation is greatly restricted.

The production of special amide-containing copolymers by reacting polyacrylic acid esters and, correspondingly, polymethacrylic acid esters with ammonia, primary and secondary amides, is described in the Patent literature.

Thus, German Patent Specification No. 655,951 discloses that amines can be reacted with polyacrylic acid esters in alcoholic or benzene solution. Under the specified reaction conditions, only relatively low rates of incorporation of the amine component are obtained with the result that the process is extremely limited in its scope of application.

It is also known from German Patent Specifications Nos. 1,077,872 and 1,088,231 that polymethacrylic acid methyl esters or copolymers largely synthesised from polymethacrylic acid methyl ester can be reacted with ammonia, primary and secondary amines in water as diluent or solvent. Under the described conditions, the use of ammonia and primary amines results in the formation of copolymers which, in addition to methacrylic acid, methacrylic acid amide and methacrylic acid methyl ester units, also contain as elements of the polymer chain large percentages of units having a cyclic imide structure. In cases where secondary amines are used in the presence of water as diluent or solvent, the proportion of methacrylic acid which can be attributed to hydrolysis in the polymeric reaction product is extremely high resulting in the formation of copolymers predominantly composed of methacrylic acid units present in the form of their ammonium salts.

In addition, it is known from German Patent Specification No. 1,060,602 that particularly reactive secondary amines, such as N-methyl glucamine, can be reacted with polyacrylic acid methyl ester at temperatures of up to 155°C in the presence of dimethyl formamide as solvent, the corresponding acrylic acid methyl ester/acrylic acid amide copolymers being formed under the autogenous catalytic effect of the glucamine. The resulting copolymers are then converted by alkaline hydrolysis in a second process stage into polymers having acrylic acid units or units consisting of acrylic acid salts. One of the limitations of the process described in German Patent Specification No. 1,060,602 is the fact that reaction temperatures above 155°C are regarded as being unsuitable because they promote the formation of crosslinked products.

Accordingly, it was surprising that simple secondary amines should lend themselves to reaction with polyacrylic acid alkyl esters in aprotic solvents, even in the strict absence of water in the reaction medium, to form ternary or quaternary copolymers which, in addition to the expected acrylic acid amide and acrylic acid ester units, also contain a large number of acrylic acid units in dependence upon the reaction conditions. It was also surprising that, in contrast to the process described in the above-mentioned German Patent Specification, secondary amines should lend themselves to reaction in aprotic solvents, even at temperatures very much higher than 155°C, without the polymer being damaged by degradation or crosslinking.

Accordingly, the present invention provides a process for the production of ternary and quaternary copolymers containing N,N-disubstituted acrylic acid amides which comprises reacting polyacrylic acid-$C_1$-$C_4$-alkyl esters with amines corresponding to the formula in which $R_1$ and $R_2$ represent identical or different members of the group consisting of $C_1$-$C_{18}$ alkyl radicals, $C_3$-$C_{18}$ cycloalkyl radicals and mixtures thereof, or with amines corresponding to the formula in which $n$ and $m$ represent numbers from 1 to 11 whilst X represents a member selected from the group consisting of —$CH_2$—, —O—, —S— and in aprotic solvents at temperatures of from 100° to 250°C and under pressures of from 0 to 100 atms.

Polyacrylic acid alkyl esters of the kind obtained in conventional manner by the radically initiated polymerisation of acrylic acid alkyl esters, represent suitable reagents. Particularly suitable acrylic acid esters include acrylic acid methyl ester, acrylic acid ethyl ester and, optionally, acrylic acid propyl ester and acrylic acid butyl ester.

The following amines are mentioned as preferred reaction components for the process according to the invention: dimethylamine, methylethylamine, diethylamine, methylpropylamine, methylisopropylamine, ethylpropylamine, ethylisopropylamine, dipropylamine, diisopropylamine, methylbutylamine, ethylbutylamine, propylbutylamine, dibutylamine and diisobutylamine.

Other suitable amines include secondary amines such as methylstearylamine, methyldodecylamine, ethyloleylamine and methylmyristylamine. It is also possible to use substituted secondary amines such as N-methyltaurine or N-methylglycine as reaction components. The following cyclic amines are also suitable for use as reaction components: pyrrolidine, piperidine, hexamethylene imine, morpholine, thiomorpholine and N-methylpiperazine.

The reactants, polyacrylic acid alkyl ester and secondary amine, are reacted in the presence of an aprotic solvent in which both the starting components and also the reaction products are readily soluble.

Suitable solvents of this kind include dimethyl formamide, dimethylacetamide, tetramethyl urea, N,N-dimethyl methoxyacetamide, N,N-dimethyl cyanamide, N,N-dimethyl cyanacetamide, hexamethyl phosphoric acid triamide, N-methyl pyrrolidone, N-formyl pyrrolidone and N-formyl morpholine.

In order to form ternary copolymers consisting of acrylic acid amide, acrylic acid ester and acrylic acid units, it is advantageous to use the particular N-formyl or N-acetyl compound on which the secondary amine to be reacted is based as solvent because the actual polymeranalogue reaction can be preceded by reaction of the secondary amine used with the solvent. For example, it has been found that, in polymeranalogue reactions carried out in dimethyl formamide with any secondary amines, dimethylamine is liberated to a considerable extent through transamidation, participating in the reaction and thus giving rise to the formation of quaternary copolymers with two structurally different acrylic acid amide components.

In the polymer-analogue reactions according to the invention, N-methyl pyrrolidone acts as a completely inert solvent in which only ternary copolymers are formed with the acrylic acid amide units derived from the secondary amine used.

Other aprotic solvents which, basically, perform no dissolving function on the copolymers to be produced by the process according to the invention, can be added to a limited extent, more particularly in such a proportion that a homogeneously dissolved system is maintained throughout the entire reaction. Solvents of this kind are, particularly, aromatic hydrocarbons such as benzene, toluene and xylene. The sole use of an aromatic solvent of this kind can be advisable in special cases, for example in the reaction of long-chain amine components such as methylstearylamine.

In cases where readily volatile amines and solvents which boil below the intended reaction temperature are used, the polymer-analogue reactions are carried out in autoclaves designed for pressure of at least up to 100 atms. In view of the relatively high reaction temperatures occurring during the process according to the invention, the following materials which are resistant to amine components have proved to be particularly suitable for the pressure vessels: VA-steel, chromium and titanium.

In many cases, the reaction according to the invention can also be carried out at normal pressure (0 atms.) in non-pressure-tight reaction vessels (for example of glass). This is always possible in cases where the boiling temperature of the solvent exceeds the intended reaction temperature and relatively high boiling amines are used.

The composition of the products obtained by the polymeranalogue reaction is largely determined not only by the type of reactants used and the ratio in which they are used, but also by the reaction temperature and the reaction time. The composition of the copolymer as a function of temperature after the reaction of polyacrylic acid methyl ester (15 % solution in dimethyl formamide) with 1.4 ml equivalents of dimethylamine for 1 hour (FIG. 1) and 10 hours (FIG. 2), is graphically illustrated in FIGS. 1 and 2. Curve 1 in FIGS. 1 and 2 corresponds to the N,N-dimethylacrylamide content. Curve 2 in FIGS. 1 and 2 corresponds to the acrylic acid content, whilst curve 3 in FIGS. 1 and 2 corresponds to the acrylic acid methyl ester content. The concentration in percent by weight is shown on the ordinates in FIGS. 1 and 2. The abscissae relate to the temperature as measured in °C.

Figure 1:
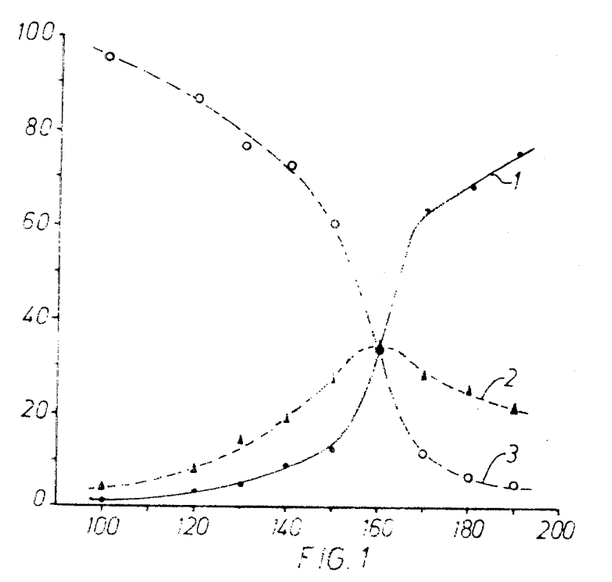
Figure 2:
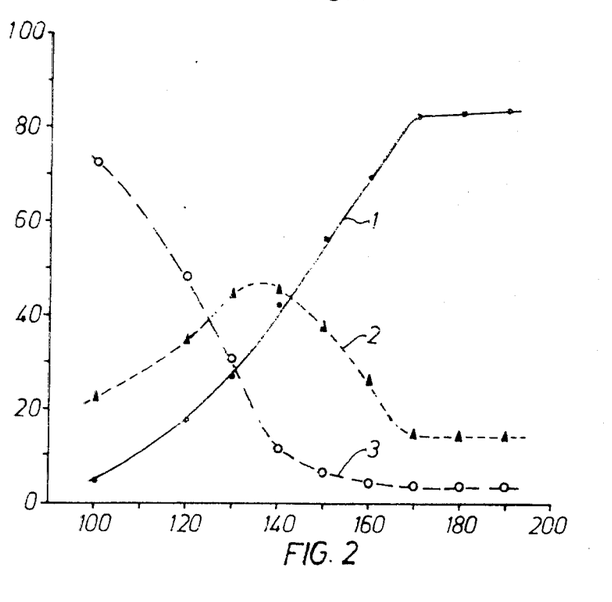

The curves illustrate the reaction sequence characteristic of the process according to the invention and the complex reaction mechanism on which it is based. Since tertiary amines are formed in an often high concentration during the reactions, the formation of acrylic acid/ammonium structures in the polymer through the transfer of alkyl groups from the ester to the secondary amine used must be assumed to be the preliminary stage of the actual amidation process.

The polymer-analogue reaction is carried out at temperatures in the range of from 100° to 250°C and preferably at temperatures in the range of from 160° to 210°C.

If allowance is made for the dependence of the copolymer composition upon the reaction temperature and the molar ratio of the reaction components used, the reaction times can amount to from 1 to 20 hours if for example an amidation rate of about 80 percent by weight is required. The reaction can be accelerated to a limited extent by the addition of known transesterification or amidation catalysts, for example, Na-methylate, Na-ethyl, Mg-methylate or lithium hydroxide.

In the process according to the invention, the amine component is used in a molar ratio of from 0.5 to 2.5, based on the molar content of the monomer units present in the polyacrylic acid alkyl ester. Since, due to the particular course of the reaction, a large proportion of the secondary amine component used is converted by alkylation into a nonreactive tertiary amine and, for this reason, cannot take part in the actual amidation reaction, a relatively large molar excess of the secondary amine is always required in cases where it is desired to obtain high amidation rates. The amine component can be added to the reaction mixture all at once at the beginning of the reaction. In many cases, however, it is better to add the amine component either continuously or in portions over a period of time adapted to the reaction time.

The concentration in which the polyacrylic acid alkyl ester solutions are reacted is governed by the molecular weight of the polyacrylates. For example, from 10 to 25 percent by weight solutions of polyacrylic acid methyl ester in dimethyl formamide or in the other aprotic solvents referred to above are suitable for the reaction in cases where the molecular weight amounts to between 50,000 and 500,000.

Some of the aforementioned solvents are unstable and decompose under the specified reaction conditions in the absence of the other components of the system. Thus, dimethyl formamide is decomposed to a large extent into carbon monoxide and dimethylamine at temperatures as low as 180°C. It is surprising that, in cases where dimethyl formamide is used, no appreciable decomposition and, hence, no interference with the reaction were detected in the process according to the invention.

Furthermore, the polymer-analogue reactions are not accompanied by any degradation reactions or even crosslinking reactions, because precipitation fractionations show that the molecular weight distribution predetermined by the polyacrylic acid esters used is maintained.

Since the reaction of polyacrylic acid alkyl esters with secondary amines in aprotic solvents involves a succession of equilibrium reactions, the amine component added had not been expected to be quantitatively incorporated, especially in reactions carried out in closed systems. Another factor which has to be taken into consideration is that fairly large proportions of the secondary amine used are alkylated with the result that appreciable quantities of tertiary amine accumulate in the reaction mixture. In cases where readily volatile amines such as dimethylamine and trimethylamine, for example, are used, the free amines can be separated off fairly easily from the polymer solutions accumulating on completion of the reaction by being distilled off with an entraining agent, for example with methanol or benzene, in a thin-layer evaporator or other apparatus. In the case of less readily volatile amines, it is advisable to apply other working-up techniques, for example extraction of the amine components with a solvent which does not dissolve the polymeric material or precipitation of the copolymer produced in the process according to the invention. Residues of free amine, but above all the amines attached to the polymer in the form of their ammonium salts, can readily be separated off by means of an acid ion exchanger.

The products according to the invention can be isolated either in solution or in pure form, depending upon the purpose for which the ternary or quaternary copolymers containing acrylic acid amides are to be used. It is advantageous directly to react the polyacrylic acid alkyl esters already obtained by solution polymerisation with amines and to leave the reaction products in their dissolved state, even during working-up. This applies particularly as regards applications in which it is desired to subject the solution to shaping operations, as in the production of films or fibres.

The invention also provides copolymers obtained by polymeranalogue reaction, consisting essentially of recurring structural units corresponding to the formulae (a), (b) and (c):

a)

b)

c)

the average chemical composition of which is limited by the concentration ranges of the components of which they are made up, namely 15 to 97 mol % of acrylic acid amide    (a)

2.5 to 55 mol % of acrylic acid    (b)
0.5 to 30 mol % of acrylic acid methyl ester    (c)

with the further condition that the molar ratio of acrylic acid to acrylic acid methyl ester is within the range 1:12 to 110:1.

According to a preferred embodiment, the invention provides copolymers produced by the process according to the invention, whose average chemical composition is limited by the concentration ranges 50 to 97 mol % of acrylic acid amide    (a)
2.5 to 35 mol % of acrylic acid    (b)
0.5 to 15 mol % of acrylic acid methyl ester    (c)

with the further condition that the molar ratio of acrylic acid to acrylic acid methyl ester is within the range of from 1:6 to 70:1.

Not all the polymer combinations that are conceivable for a ternary system can be achieved by the process of polymer-analogue reaction on account of the special reaction mechanism. If, as is usually the case with ternary copolymers, a triangular coordinate system is used to describe the chemical composition, the polymers accumulating during the reaction of polyacrylic acid methyl ester with secondary amines, especially with dimethylamine, morpholine, thiomorpholine, N-methylpiperazine and methylstearylamine, are represented by points situated within the hatched surface of FIG. 3. Coordinate I indicates the N,N-dialkyl acrylic acid amide content, coordinate II the acrylic acid content and coordinate III the acrylic acid methyl ester content, in each case in mol percent.

Figure 3:
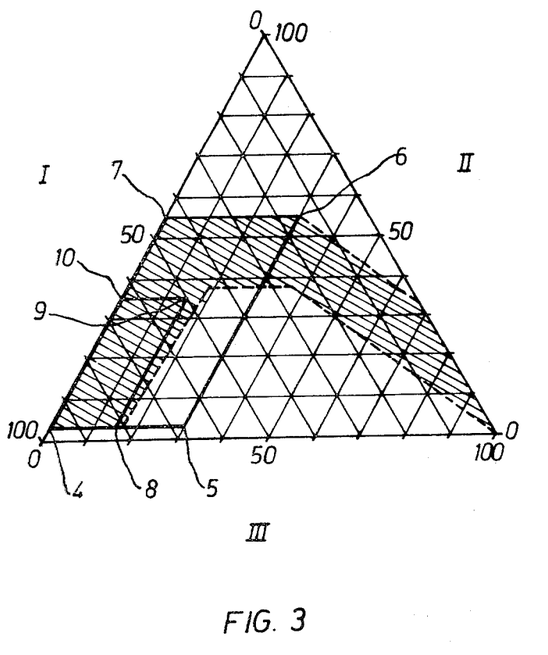

We are claiming copolymers having chemical compositions which fall within the area 4, 5, 6, 7 in FIG. 3. Copolymers of this kind are commercial interest by virtue of their special properties, above all by virtue of their solubility in water.

Preferred copolymers are those represented in FIG. 3 by the area 4, 8, 9, 10 because they are distinguished by their particularly high compatibility with a number of commercially important polymers.

The reaction products according to the invention are particularly suitable for use as thickeners for printing pastes, especially those produced by the process described in DOS No. 2,014,763, and as gloss stabilisers for modacrylic filaments and films.

Unless otherwise stated, the viscosity numbers [η] quoted in the following Examples were determined in dimethyl formamide at 25°C.

The chemical composition of the polymers described in the Examples were determined from the values accessible through elemental analysis (C, H, N —OCH₃ in which X =  ,  ,   S , etc.). The acrylic acid content was determined by titration.

Accordingly, addition of the percentage fractions of the components synthesising the polymer generally gives values differing from 100 percent.

The following Examples are to further illustrate the invention without limiting it.

EXAMPLE 1

240 g of polyacrylic acid methyl ester (molecular weight $\overline{M}_r = 250,000$), dissolved in 1,360 g of anhydrous dimethyl formamide, were reacted with 140 g of dimethylamine in a 3 litre shaker-type autoclave of titanium. The molar excess of dimethylamine amounted to 10 percent. At a reaction temperature of 180°C, the internal pressure in the reaction vessel initially rose to 20 atms., subsequently falling to about 14 atms. as the degree of conversion increased. After 10 hours, a pale yellow coloured reaction solution was isolated and a polymer of the following composition recovered from it:

| | |
|---|---|
| N,N-dimethylacrylic acid amide | 72.0 % by weight |
| acrylic acid | 19.5 % by weight |
| acrylic acid methyl ester | 8.5 % by weight |

The reaction product which had a viscosity number $[\eta]_{DMF}$ of 0.97 formed clear solutions in methanol and water.

EXAMPLES 2 to 9

Following the procedure described in Example 1, 15 percent polyacrylic acid methyl ester solutions in dimethyl formamide (molecular weight of the polymethylacrylate: $\overline{M}_r = 250,000$) were reacted in the following tests with 1.1 mol equivalents of dimethylamine under the conditions set out in the following Table.

| Example | 2 | 3 | 4 | 5 | 6 | 7 | 8 | 9 |
|---|---|---|---|---|---|---|---|---|
| Reaction conditions: | | | | | | | | |
| reaction temperature [°C] | 100 | 120 | 140 | 150 | 160 | 170 | 180 | 200 |
| reaction time [hours] | 10 | 10 | 10 | 10 | 10 | 10 | 10 | 10 |
| Reaction product: | | | | | | | | |
| N,N-dimethylacrylamide content [% by weight] | 3.5 | 12.7 | 28.5 | 53.2 | 69.3 | 69.0 | 71.8 | 75.3 |
| acrylic acid content [% by weight] | 15.3 | 25.3 | 39.3 | 31.5 | 24.8 | 22.1 | 19.7 | 18.1 |
| acrylic acid methyl ester content [% by weight] | 82.0 | 63.5 | 30.5 | 18.1 | 8.1 | 8.0 | 7.9 | 6.6 |
| viscosity number $[\eta]_{DMF}$ | 1.01 | 2.17 | 1.32 | 1.16 | 1.01 | 0.94 | 0.97 | 0.86 |

EXAMPLES 10 to 14

The tests summarised in the following Tables were carried out in a 6 litre stirrer-type autoclave of VA-steel. The reaction vessel was freed from moisture by heating and evacuation. Thereafter, 4,000 g batches of an anhydrous 15 percent solution of polyacrylic acid methyl ester in dimethyl formamide (molecular weight of the polymethacrylate $\overline{M}_r = 240,000$) were introduced and, after the particular reaction temperature required had been reached, 440 g of dimethylamine (1.4 mol equivalents) were added over a period of 10 minutes. The composition of the polymers in dependence upon the reaction time was determined by sampling after reaction times of 1, 2, 3, 4, 6, 8 and 10 hours.

| Example Temperature | Reaction time [hours] | polymer composition: $-CH_2-CH-\overset{O}{\underset{\|}{C}}-R$ [% by weight] | | |
|---|---|---|---|---|
| | | $R = N\overset{CH_3}{\underset{CH_3}{\diagdown}}$ | $R = -OH$ | $R = -OCH_3$ |
| 10 | 1.0 | 1.2 | 4.2 | 95.0 |
| | 2.0 | 1.5 | 6.2 | 89.2 |
| 100°C | 3.0 | 2.5 | 8.5 | 90.5 |
| | 4.0 | 2.7 | 10.6 | 86.5 |
| | 6.0 | 3.1 | 14.9 | 80.3 |
| | 8.0 | 5.2 | 18.8 | 78.0 |
| $[\eta]_{DMF} = 1.4$ | 10.0 | 5.0 | 22.2 | 72.6 |

| Example | Reaction Temperature | time [hours] | polymer composition: $-CH_2-CH-\overset{\overset{O}{\|}}{C}-R$ [% by weight] | | |
|---|---|---|---|---|---|
| | | | $R = N\begin{smallmatrix}CH_3\\CH_3\end{smallmatrix}$ | $R = -OH$ | $R = -OCH_3$ |
| 11 | | 1.0 | 3.5 | 8.2 | 86.5 |
| | | 2.0 | 7.75 | 14.5 | 76.5 |
| | | 3.0 | 10.3 | 17.0 | 71.1 |
| | 120°C | 4.0 | 10.7 | 21.1 | 69.0 |
| | | 6.0 | 11.3 | 26.0 | 60.3 |
| | | 8.0 | 15.9 | 29.0 | 53.0 |
| $[\eta]_{DMF} = 1.65$ | | 10.0 | 17.7 | 34.8 | 48.0 |
| 12 | | 1.0 | 9.2 | 19.0 | 72.7 |
| | | 2.0 | 20.3 | 31.9 | 49.6 |
| | | 3.0 | 26.5 | 35.5 | 40.2 |
| | 140°C | 4.0 | 30.4 | 38.2 | 29.4 |
| | | 6.0 | 38.2 | 42.1 | 19.5 |
| | | 8.0 | 39.8 | 46.1 | 15.1 |
| $[\eta]_{DMF} = 1.13$ | | 10.0 | 42.3 | 45.3 | 11.8 |
| 13 | | 1.0 | 33.2 | 34.5 | 32.8 |
| | | 2.0 | 40.0 | 38.2 | 21.3 |
| | | 3.0 | 54.1 | 35.5 | 13.5 |
| | 160°C | 4.0 | 55.5 | 34.0 | 8.9 |
| | | 6.0 | 64.2 | 30.5 | 4.9 |
| | | 8.0 | 67.8 | 28.5 | 4.5 |
| $[\eta]_{DMF} = 0.62$ | | 10.0 | 69.0 | 26.1 | 4.0 |
| 14 | | 1.0 | 68.1 | 25.2 | 7.0 |
| | | 2.0 | 75.1 | 22.3 | 3.6 |
| | | 3.0 | 80.1 | 16.8 | 4.0 |
| | 180°C | 4.0 | 83.5 | 15.5 | 4.3 |
| | | 6.0 | 83.5 | 14.8 | 4.1 |
| | | 8.0 | 82.8 | 14.4 | 4.5 |
| $[\eta]_{DMF} = 0.49$ | | 10.0 | 83.0 | 14.1 | 3.9 |

EXAMPLE 15

A 100 litre stirrer-type autoclave of VA-steel was filled with 60 kg of an anhydrous, 15 % solution of polyacrylic acid methyl ester ($\overline{M}_r = 250,000$) in dimethyl formamide. 9.4 kg $\triangleq$ 13.5 litres of dimethylamine (2.0 mol equivalents) were then continuously pumped into the tightly sealed reaction vessel at 190°C with the stirrer turning at 60 r.p.m.

| | |
|---|---|
| Pumping rate: | 4.5 litres per hour |
| Pumping time: | 3.0 hours |

The reaction mixture was then kept at 190°C for another 5 hours. After a cooling period, the amine components present in the reaction mixture could be removed by distillation and/or by treatment with an acid ion exchanger. The polymeric reaction product with a solution viscosity $[\eta]_{DMF}$ of 0.41 had the following composition:

| | |
|---|---|
| N,N-dimethylacrylic acid amide | 94.5 % by weight |
| acrylic acid | 6.55 % by weight |
| acrylic acid methyl ester | 0.55 % by weight |

EXAMPLE 16

1,500 g of a 15 % solution of polyacrylic acid butyl ester in dimethyl formamide (molecular weight of the polybutylacrylate $\overline{M}_r = 210,000$) were reacted with 110 g of dimethylamine (1.4 mol equivalents) at 190°C in a 3 litre stirrer-type autoclave of titanium. After 8 hours, a terpolymer of the following composition could be recovered from the pale yellow coloured reaction solution by precipitation with water:

| | |
|---|---|
| acrylic acid butyl ester | 71.4 % by weight |
| N,N-dimethylacrylamide | 22.0 % by weight |
| acrylic acid | 7.5 % by weight |

$[\eta]_{DMF} = 0.78$

The isolated copolymer was soluble in methanol, but insoluble in water.

EXAMPLES 17 to 27

15 % solutions of polyacrylic acid methyl ester in dimethyl formamide (molecular weight of the polyacrylic acid methyl ester $\overline{M}_r = 250,000$) were reacted as in Example 1 with 1.4 mol equivalents of the following secondary amines. Copolymers which can be characterised as follows by their viscosity numbers and their compositions, could be isolated after reaction at 180°C for 8 hours.

| amine component $H-N\begin{array}{l}R_1\\R_2\end{array}$ | polymer composition: $-CH_2-CH(-)-C(=O)-X$ [% by weight] | | | | viscosity $[\eta]_{DMF}$ |
|---|---|---|---|---|---|
| | $X = -N(CH_3)_2$ | $X = -N\begin{array}{l}R_1\\R_2\end{array}$ | $X = -OH$ | $X = -OCH_3$ | |
| 17) $R_1=R_2$=methyl | 85.2 | | 12.7 | 3.3 | 0.57 |
| 18) $R_1=R_2$=ethyl | 64.0 | 19.7 | 13.5 | 3.3 | 0.54 |
| 19) $R_1=R_2$=n-propyl | 62.4 | 20.9 | 12.05 | 4.2 | 0.56 |
| 20) $R_1=R_2$=n-butyl | 62.25 | 16.35 | 15.3 | 6.1 | 0.53 |
| 21) $R_1=R_2$=isobutyl | 56.1 | 12.7 | 19.25 | 11.9 | 0.50 |
| 22) $R_1$=ethyl, $R_2$=cyclohexyl | 51.2 | 22.8 | 15.7 | 10.3 | 0.48 |
| 23) $R_1=R_2$=cyclohexyl | 28.5 | 13.7 | 15.42 | 42.4 | 0.44 |
| 24) H-N⟨morpholine⟩ | 62.7 | 20.4 | 12.4 | 4.4 | 0.56 |
| 25) n=4 $H-N(CH_2)_n$ | 59.8 | 21.7 | 12.0 | 6.4 | 0.56 |
| 26) n=5 | 71.2 | 14.2 | 11.0 | 3.6 | 0.56 |
| 27) n=6 | 63.7 | 20.1 | 12.6 | 3.6 | 0.82 |

| amine component $H-N\begin{array}{l}R_1\\R_2\end{array}$ | polymer composition: $-CH_2-CH(-)-C(=O)-X$ [% by weight] | | | viscosity $[\eta]_{DMF}$ |
|---|---|---|---|---|
| | $X = -N\begin{array}{l}R_1\\R_2\end{array}$ | $X = -OH$ | $X = -OCH_3$ | |
| 28) $R_1=R_2$=methyl | 72.2 | 23.1 | 6.4 | 0.92 |
| 29) $R_1=R_2$=ethyl | 71.5 | 16.1 | 14.3 | 0.52 |
| 30) $R_1=R_2$=n-propyl | 70.8 | 14.5 | 15.0 | 0.53 |
| 31) $R_1=R_2$=n-butyl | 63.3 | 15.1 | 22.9 | 0.5 |
| 32) $R_1=R_2$=isobutyl | 48.4 | 13.1 | 38.2 | 0.58 |
| 33) $R_1$=ethyl, $R_2$=cyclohexyl | 61.4 | 18.2 | 22.5 | 0.52 |

| amine component $H-N\overset{R_1}{\underset{R_2}{\diagup}}$ | polymer composition: $-CH_2-CH-\overset{O}{\overset{\|}{C}}-X$ [% by weight] $X = -N\overset{R_1}{\underset{R_2}{\diagup}}$ | $X = -OH$ | $X = -OCH_3$ | viscosity $[\eta]_{DMF}$ |
|---|---|---|---|---|
| 34) R$_1$=R$_2$=cyclohexyl | 41.8 | 16.3 | 43.5 | 0.7 |
| 35) H-N⟨(CH$_2$)$_n$⟩ n=4 | 79.7 | 13.2 | 6.9 | 0.25 |
| 36) n=5 | 80.2 | 18.8 | 4.7 | 0.55 |
| 37) n=6 | 74.6 | 19.1 | 3.5 | 1.14 |
| 38) H-N⟨O⟩ | 81.5 | 17.3 | 1.9 | 0.28 |
| 39) H-N⟨S⟩ | 75.3 | 18.4 | 6.9 | 0.64 |
| 40) H-N⟨N-CH$_3$⟩ | 61.2 | approximately 25.0 | 13.7 | 0.98 |

EXAMPLES 28 to 40

15 % polyacrylic acid methyl ester solutions in N-methyl pyrrolidone (molecular weight of the polymethyl acrylate: $\overline{M}_r = 250,000$) were reacted as in Example 1 with 1.4 mol equivalents of the following amines. Terpolymers which could be characterised as follows by their chemical compositions and their viscosity numbers, were isolated after reaction at 180°C for 8 hours.

EXAMPLE 41

50 g of polyacrylic acid methyl ester (molecular weight: $\overline{M}_r = 130,000$), dissolved in 450 g of toluene, were reacted with 82.5 g of methylstearylamine (0.5 mol equivalents) at 180°C in a 1.3 litre stirrer-type autoclave of VA-steel. After 10 hours, a copolymer of the following composition was isolated from the pale yellow coloured reaction solution following separation of the unreacted amine component:

| | |
|---|---|
| N-methyl-N-stearyl acrylic acid amide | 66.0 % by weight |
| acrylic acid methyl ester | 31.5 % by weight |
| acrylic acid | 3.5 % by weight |

$[\eta]_{benzene} = 0.39$

We claim:
1. A process for the production of water-soluble copolymers consisting essentially of recurring structural units corresponding to the formulae (a), (b), and (c)

$$\underset{\underline{a)}}{-CH_2-CH- \atop | \atop O=C-X} \qquad \underset{\underline{b)}}{-CH_2-CH- \atop | \atop O=C-OH} \qquad \underset{\underline{c)}}{-CH_2-CH- \atop | \atop O=C-OCH_3}$$

wherein X is $$-N\overset{CH_3}{\underset{CH_3}{\diagup}}, \quad -N\overset{CH_2-CH_2}{\underset{CH_2-CH_2}{\diagup\!\diagdown}}O, \quad -N\overset{CH_2-CH_2}{\underset{CH_2-CH_2}{\diagup\!\diagdown}}S,$$

$$-N\overset{CH_2-CH_2}{\underset{CH_2-CH_2}{\diagup\!\diagdown}}N-CH_3 \quad \text{or} \quad -N\overset{CH_3}{\underset{(CH_2)_{17}-CH_3}{\diagup}}$$

by reacting polyacrylic acid methyl ester with an amine of the formula $$H-N\overset{CH_3}{\underset{CH_3}{\diagup}}, \quad H-N\overset{CH_2-CH_2}{\underset{CH_2-CH_2}{\diagup\!\diagdown}}O, \quad H-N\overset{CH_2-CH_2}{\underset{CH_2-CH_2}{\diagup\!\diagdown}}S,$$

$$H-N\overset{CH_2-CH_2}{\underset{CH_2-CH_2}{\diagup\!\diagdown}}N-CH_3 \quad \text{or} \quad H-N\overset{CH_3}{\underset{(CH_2)_{17}-CH_3}{\diagup}}$$

in an aprotic solvent consisting essentially of dimethyl formamide, dimethylacetamide, tetramethyl urea, N,N-dimethyl methoxy-acetamide, N,N-dimethyl cyanamide, N,N-dimethyl cyanacetamide, hexamethyl phosphoric acid triamide, N-methyl pyrrolidone, N-formyl pyrrolidone or N-formyl morpholine; at a temperature from 160°C to 210°C under a pressure of 0 to 100 atm; for a period of time and under conditions to form a copolymer having an average chemical composition of:

15 to 97 mol % of acrylic acid amide (a)
2.5 to 55 mol % of acrylic acid (b)
0.5 to 30 mol % of acrylic acid methyl ester (c)

in which the molar ratio of acrylic acid to acrylic acid methyl ester amounts to between 1:12 and 110:1.

2. A process as claimed in claim 1, wherein the reaction is carried out in dimethyl formamide, dimethylacetamide or N-methyl pyrrolidone as the aprotic solvent.

3. Water-soluble terpolymers obtained by the polymer-analogue reaction of polyacrylic acid methyl ester with secondary amines in aprotic solvents, consisting essentially of recurring structural units corresponding to the formulae (a), (b) and (c)

whose average chemical composition is determined by the concentration ranges of the components of which they are made up, namely:

15 to 97 mol % of acrylic acid amide (a)
2.5 to 55 mol % of acrylic acid (b)
0.5 to 30 mol % of acrylic acid methyl ester (c)

with the further condition that the molar ratio of acrylic acid to acrylic acid methyl ester amounts to between 1:12 and 110:1.

4. Water-soluble terpolymers as claimed in claim 3, wherein their average chemical composition is limited by the concentration ranges:

50 to 97 mol % of acrylic acid amide (a)
2.5 to 35 mol % of acrylic acid (b)
0.5 to 15 mol % of acrylic acid methyl ester (c)

with the further condition that the molar ratio of acrylic acid to acrylic acid methyl ester amounts to between 1:6 and 70:1.

* * * * *